US010108537B2

(12) United States Patent
Cantrell, Jr. et al.

(10) Patent No.: US 10,108,537 B2
(45) Date of Patent: Oct. 23, 2018

(54) MECHANISMS FOR REPRODUCING STORAGE SYSTEM METADATA INCONSISTENCIES IN A TEST ENVIRONMENT

(71) Applicant: Red Hat, Inc., Raleigh, NC (US)

(72) Inventors: David L. Cantrell, Jr., Medford, MA (US); Christopher E. Lumens, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 116 days.

(21) Appl. No.: 15/164,522

(22) Filed: May 25, 2016

(65) Prior Publication Data

US 2016/0335176 A1 Nov. 17, 2016

Related U.S. Application Data

(63) Continuation-in-part of application No. 13/306,338, filed on Nov. 29, 2011, now Pat. No. 9,720,808.

(51) Int. Cl.
*G06F 9/44* (2018.01)
*G06F 11/36* (2006.01)
(Continued)

(52) U.S. Cl.
CPC ............ *G06F 11/3696* (2013.01); *G06F 8/61* (2013.01); *G06F 11/366* (2013.01); *G06F 11/3664* (2013.01); *G06F 17/30371* (2013.01)

(58) Field of Classification Search
CPC ............ G06F 11/3696; G06F 11/3664; G06F 11/366; G06F 8/61; G06F 17/30371
(Continued)

(56) References Cited

U.S. PATENT DOCUMENTS 6,718,436 B2 *   4/2004   Kim ..................... G06F 3/0601
                                                          711/114
6,952,819 B1 *  10/2005   Wada .................... G06Q 10/00
                                                          717/123
(Continued)

FOREIGN PATENT DOCUMENTS

WO           2002029391 A2      4/2002

OTHER PUBLICATIONS

Aguilera et al., "Olive: distributed point-in-time branching storage for real systems", May 2006, USENIX Association.*

(Continued)

*Primary Examiner* — Wei Zhen
*Assistant Examiner* — Junchun Wu
(74) *Attorney, Agent, or Firm* — Withrow & Terranova, PLLC (57) ABSTRACT

Mechanisms for recreating a first inconsistency in storage system metadata encountered by an installation module during a software installation process on a first computing device are provided. A test computing device accesses on a remote storage device inconsistent storage system metadata associated with the first computing device. The inconsistent storage system metadata includes a plurality of storage system metadata segments, location information that identifies corresponding locations of the respective storage system metadata segments on at least one storage device of the first computing device, and length information that identifies corresponding lengths of the respective storage system metadata segments. For each respective storage system metadata segment of the plurality of storage system metadata segments, the respective storage system metadata segment is stored at the corresponding location on a first test storage device of a test computing device.

19 Claims, 8 Drawing Sheets

(51) Int. Cl.
  *G06F 8/61* (2018.01)
  *G06F 17/30* (2006.01)
(58) Field of Classification Search
  USPC ........................................................ 717/128
  See application file for complete search history.

(56) References Cited

U.S. PATENT DOCUMENTS

| | | | |
|---|---|---|---|
| 7,680,957 B1 | 3/2010 | Ketterhagen et al. | |
| 7,809,898 B1* | 10/2010 | Kiselev | G06F 11/2064 |
| | | | 711/111 |
| 7,873,619 B1* | 1/2011 | Faibish | G06F 17/30091 |
| | | | 707/705 |
| 7,885,923 B1* | 2/2011 | Tawri | G06F 11/2064 |
| | | | 707/610 |
| 8,140,804 B1* | 3/2012 | Sobel | G06F 3/0605 |
| | | | 710/8 |
| 8,281,301 B2 | 10/2012 | Kaneda | G06F 8/63 |
| | | | 717/168 |
| 8,621,269 B2* | 12/2013 | Vas | H04L 63/06 |
| | | | 714/6.1 |
| 8,713,356 B1 | 4/2014 | Chan et al. | |
| 9,087,013 B2 | 7/2015 | Linde | |
| 9,094,446 B2 | 7/2015 | Chakra et al. | |
| 9,104,813 B2 | 8/2015 | Stanquist et al. | |
| 2004/0073846 A1 | 4/2004 | Nakanishi et al. | |
| 2005/0228832 A1* | 10/2005 | Ghotge | G06F 11/0727 |
| 2005/0240901 A1* | 10/2005 | McKnight | G06F 9/4443 |
| | | | 717/110 |
| 2007/0088754 A1* | 4/2007 | Brannon | G06F 17/3051 |
| 2007/0234334 A1* | 10/2007 | Araujo, Jr. | G06F 9/45558 |
| | | | 717/168 |
| 2008/0313416 A1* | 12/2008 | Frondozo | G06F 11/1435 |
| | | | 711/162 |
| 2009/0265587 A1 | 10/2009 | Yamaguchi | |
| 2011/0078512 A1* | 3/2011 | Grube | G06F 11/10 |
| | | | 714/42 |
| 2011/0107327 A1* | 5/2011 | Barkie | G06F 8/63 |
| | | | 717/176 |
| 2013/0179481 A1* | 7/2013 | Halevy | G06F 17/30094 |
| | | | 707/827 |
| 2017/0091257 A1* | 3/2017 | Vijayvargiya | G06F 17/30371 |

OTHER PUBLICATIONS

Bucur et al., "Parallel Symbolic Execution for Automated Real-World Software Testing", Apr. 2011, ACM, pp. 1-15.*
Tomonori et al., "Protecting the integrity of an entire file system", 2003, IEEE.*
Zhiming et al., "Fault Detection for high Availability RAID System", 2010, IEEE.*
Author Unknown, "14. Troubleshooting," NeoFinder Users Guide, Date Unknown, Date Accessed: Mar. 28, 2016, 2 pages, http://cdfinder.de/guide/14/neofinder-troubleshooting.html.
Saxena, Neeraj et al., "Create defects automatically from automation playback report," IBM Corporation, Jul. 22, 2014, 7 pages, http://www.ibm.com/developerworks/rational/library/create-defects-automatically-automation-playback-report/index.html.

* cited by examiner

MECHANISMS FOR REPRODUCING STORAGE SYSTEM METADATA INCONSISTENCIES IN A TEST ENVIRONMENT

RELATED APPLICATIONS

This application is a continuation-in-part of co-pending U.S. patent application Ser. No. 13/306,338, filed on Nov. 29, 2011, entitled METHOD FOR REMOTE DEBUGGING USING A REPLICATED OPERATING ENVIRONMENT, the disclosure of which is hereby incorporated herein by reference in its entirety.

TECHNICAL FIELD

The examples relate generally to storage system metadata inconsistencies and, in particular, to mechanisms for reproducing storage system metadata inconsistencies in a test environment.

BACKGROUND

Storage devices include storage system metadata that is utilized by software, such as operating systems, to organize data on the storage devices. Sometimes individuals attach storage devices that were previously utilized on different computing devices to the same computing device. If the individuals do not properly format the storage devices, the storage system metadata on the storage devices may be inconsistent.

SUMMARY

The examples include mechanisms for recreating storage system metadata inconsistencies in a test environment. Recreating storage system metadata inconsistencies can be useful in establishing a test environment for an installation module, and facilitates testing of modifications of the installation module that enable the installation module to recognize and correct the storage system metadata inconsistencies instead of simply terminating.

In one example, a method for recreating a first inconsistency in storage system metadata encountered by an installation module during a software installation process on a first computing device is provided. The method includes accessing on a remote storage device by a test computing device, inconsistent storage system metadata associated with the first computing device, the inconsistent storage system metadata comprising a plurality of storage system metadata segments, location information that identifies corresponding locations of the respective storage system metadata segments on at least one storage device of the first computing device, and length information that identifies corresponding lengths of the respective storage system metadata segments. The method further includes storing, for each respective storage system metadata segment of the plurality of storage system metadata segments, the respective storage system metadata segment at the corresponding location on a first test storage device of a test computing device.

In another example a test computing device for recreating a first inconsistency in storage system metadata encountered by an installation module during a software installation process on a first computing device is provided. The test computing device includes a memory, and a processor device coupled to the memory. The processor device is to access, on a remote storage device, inconsistent storage system metadata associated with the first computing device, the inconsistent storage system metadata comprising a plurality of storage system metadata segments. The processor device is further to access, on the remote storage device, location information that identifies corresponding locations of the respective storage system metadata segments on at least one storage device of the first computing device. The processor device is further to access, on the remote storage device, length information that identifies corresponding lengths of the respective storage system metadata segments. The processor device is further to store, for each respective storage system metadata segment of the plurality of storage system metadata segments, the respective storage system metadata segment at the corresponding location on a first test storage device of the test computing device.

In another example, a computer program product for recreating a first inconsistency in storage system metadata encountered by an installation module during a software installation process on a first computing device is provided. The computer program product is stored on a non-transitory computer-readable storage medium and includes instructions to cause a processor device to carry out steps of accessing on a remote storage device, inconsistent storage system metadata associated with the first computing device, the inconsistent storage system metadata comprising a plurality of storage system metadata segments, location information that identifies corresponding locations of the respective storage system metadata segments on at least one storage device of the first computing device, and length information that identifies corresponding lengths of the respective storage system metadata segments. The instructions are further to cause the processor device to carry out the step of storing, for each respective storage system metadata segment of the plurality of storage system metadata segments, the respective storage system metadata segment at the corresponding location on a first test storage device of a test computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first inconsistency" and "second inconsistency," and does not imply a priority, a type, an importance, or other attribute, unless otherwise stated herein. As used herein and in the claims, the articles "a" and "an" in reference to an element refers to "one or more" of the element unless otherwise explicitly specified.

Computing devices often utilize storage devices, such as hard disk drives and solid state drives, to store data. When software is installed on a computing device, it is common for an installation process to analyze the existing storage devices prior to installation of the software. Understanding an existing storage system structure is particularly important when lower level software, such as an operating system, is being installed on the computing device because part of the installation process may involve altering the existing storage system structure to accommodate the operating system in accordance with a user's desires.

Storage devices include storage system metadata that is utilized by software, such as operating systems, to organize data on the storage devices. The storage system metadata can include, for example, file system metadata that identifies how files are organized on the storage device, partition table metadata that identifies partitions of the storage device, redundant array of independent disks (RAID) metadata used to implement redundancy, and the like. Sometimes individuals attach storage devices that were previously utilized on different computing devices to the same computing device. If the individuals do not properly format the storage devices, the storage system metadata on the storage devices may be inconsistent. For example, RAID metadata on one storage device may refer to a storage device that is not attached to the computing device.

Installation processes that encounter inconsistent storage system metadata often cannot continue the installation process until the storage system metadata is made consistent. Installation processes that terminate prior to successfully installing the software can lead to customer dissatisfaction with the software vendor.

The examples include mechanisms for recreating storage system metadata inconsistencies in a test environment. Recreating storage system metadata inconsistencies can be useful in establishing a test environment for an installation module, and facilitates testing of modifications of the installation module that enable the installation module to recognize and correct the storage system metadata inconsistencies instead of simply terminating.

Figure 1:
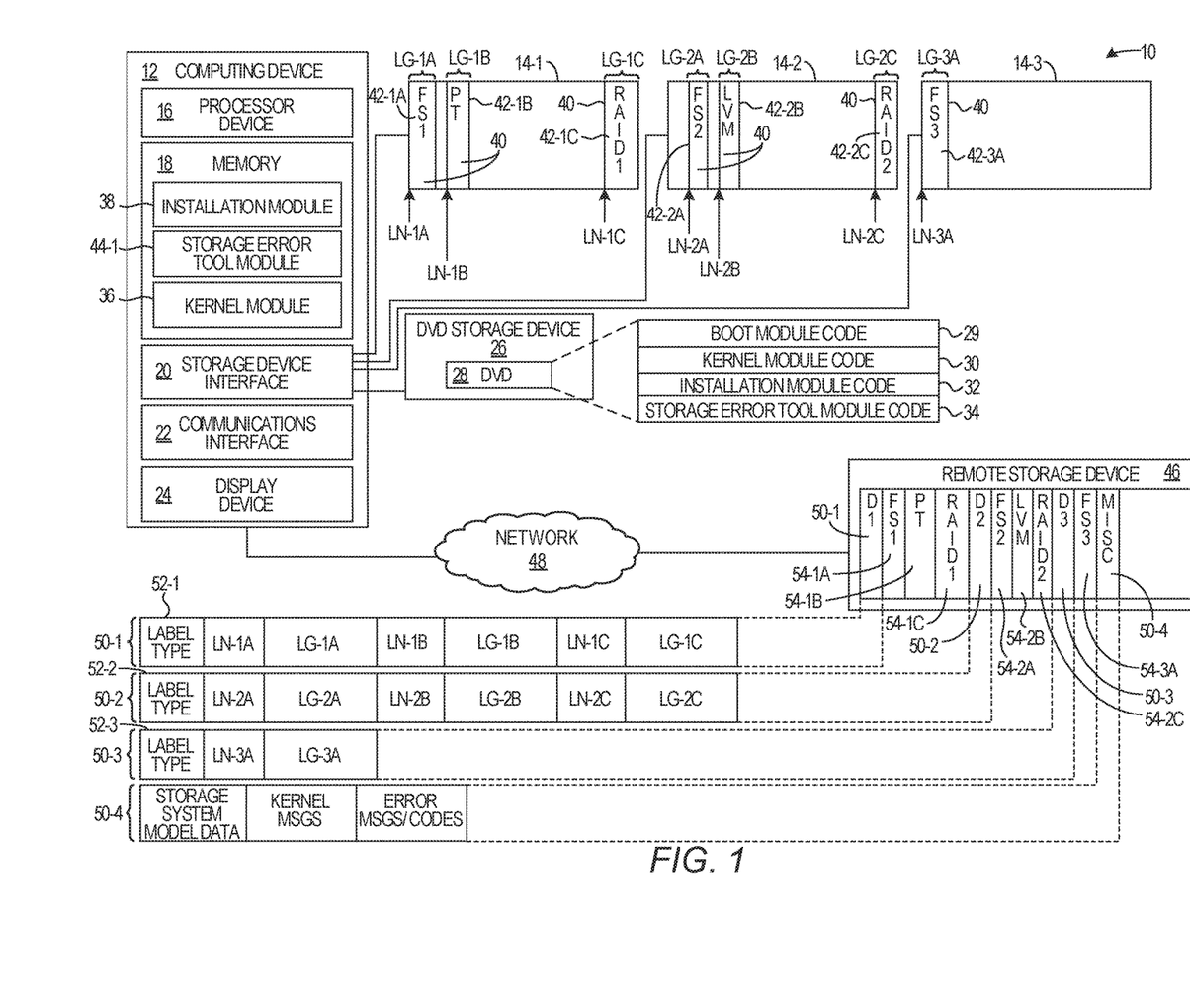
FIG. 1 is a block diagram of a system in which examples may be practiced.

FIG. 1 is a block diagram of a system 10 in which examples may be practiced. The system 10 includes a computing device 12 (sometimes referred to herein as the "first computing device") to which a plurality of storage devices 14-1-14-3 (generally, storage devices 14) are attached. The storage devices 14 may comprise any combination of types of storage devices, such as, by way of non-limiting example, hard disk drives, solid state drives, or the like. The computing device 12 includes a processor device 16, a memory 18, a storage device interface 20, a communications interface 22, and a display device 24. The storage device interface 20 facilitates communication between the processor device 16 and the storage devices 14 and a DVD storage device 26. A DVD 28 comprises a computer-readable medium that is positioned in the DVD storage device 26 and includes executable code such as a boot module code 29, a kernel module code 30, an installation module code 32, and a storage error tool module code 34. In this example, an individual (not illustrated), is installing an operating system onto the storage devices 14 of the computing device 12 via the DVD 28. While for purposes of illustration the examples disclose the use of the DVD 28, the examples have utility with any type of storage device, including, by way of non-limiting example, CDs, USB drives, or the like.

The processor device 16 reads the boot module code 29 and initiates a boot module (not illustrated) in the memory 18. The boot module causes a kernel module 36 to be initiated in the memory 18 from the kernel module code 30. The kernel module 36 causes an installation module 38 to be initiated in the memory 18 from the installation module code 32.

The installation module 38, among other tasks, performs a storage device discovery function that involves identifying each storage device 14 attached to the computing device 12, and determining the existing user storage state of the storage devices 14. A user storage state refers to the manner in which a respective storage device 14 organizes data stored on the respective storage device 14. The user storage state is identified via storage system metadata 40 that exists on the storage devices 14. The storage system metadata 40 comprises data that is utilized by lower level software, such as an operating system, to organize user data that is stored on the storage devices 14. The storage system metadata 40 may comprise, for example, file system metadata that identifies how files are organized on the storage device 14, partition table metadata that identifies partitions of the storage device, redundant array of independent disks (RAID) metadata used to implement redundancy, logical volume manager (LVM) metadata used by a logical volume manager to generate logical volumes from the storage device 14.

In this example, the storage system metadata 40 comprises a plurality of different storage system metadata segments 42-1A-42-1C located on the storage device 14-1, storage system metadata segments 42-2A-42-2C located on the storage device 14-2, and a storage system metadata segment 42-3A located on the storage device 14-3. The storage system metadata segment 42-1A comprises file system metadata that defines a file structure that is utilized by the operating system of the computing device 12 to store files on the storage device 14-1. The storage system metadata segment 42-1A is located at a physical location LN-1A on the storage device 14-1. The location LN-1A may be defined, for example, by a byte offset from the first byte of the storage device 14-1. The storage system metadata segment 42-1A has a length LG-1A. The length LG-1A may be identified in any desired units, such as bytes, sectors, blocks, or the like.

The storage system metadata segment 42-1B comprises partition table metadata that defines partitions that are utilized by the operating system of the computing device 12 to separate files on the storage device 14-1. The storage system metadata segment 42-1B is located at a physical location LN-1B on the storage device 14-1 and has a length LG-1B. The storage system metadata segment 42-1C comprises RAID metadata used to implement data redundancy. The storage system metadata segment 42-1C is located at a physical location LN-1C on the storage device 14-1 and has a length LG-1C.

The storage system metadata segment 42-2A comprises file system metadata that defines a file structure that is utilized by the operating system of the computing device 12 to store files on the storage device 14-2. The storage system metadata segment 42-2A is located at a physical location LN-2A on the storage device 14-2 and has a length LG-2A. The storage system metadata segment 42-2B comprises LVM metadata that defines a logical volume. The storage system metadata segment 42-2B is located at a physical location LN-2B on the storage device 14-2 and has a length LG-2B. The storage system metadata segment 42-2C comprises RAID metadata used to implement data redundancy. The storage system metadata segment 42-2C is located at a physical location LN-2C on the storage device 14-2 and has a length LG-2C.

The storage system metadata segment 42-3A comprises file system metadata that defines a file structure that is utilized by the operating system of the computing device 12 to store files on the storage device 14-3. The storage system metadata segment 42-3A is located at a physical location LN-3A on the storage device 14-3 and has a length LG-3A. Space on the storage devices 14-1-14-3 that do not contain storage system metadata 40 may be empty, or may contain user data, such as files.

The installation module 38 may comprise any suitable installation module, such as, by way of non-limiting example, Anaconda, available from the Fedora™ Project Organization, that has been modified to provide the functionality described herein. The installation module 38, during the device discovery function, may generate storage system model data that models the storage system metadata 40. The storage system model data may take any suitable form, such as a directed acyclic graph that is built using the storage system metadata 40 and which describes, in accordance with the storage system metadata 40, the storage devices 14 and how different storage device technologies, such as the storage device filesystem, partition tables, LVM system and RAID system are implemented on the computing device 12.

In this example assume that prior to initiating the software installation process, the computing device 12 was initially attached to only the storage device 14-1. An individual removed the storage devices 14-2, 14-3 from other computing devices, and attached the storage devices 14-2, 14-3 to the computing device 12. In this situation, the storage system metadata 40 on the storage device 14-1 may be inconsistent with both the storage system metadata 40 on the storage device 14-2 and the storage system metadata 40 on the storage device 14-3. Further, the storage system metadata 40 on the storage device 14-2 is also likely inconsistent with the storage system metadata 40 on the storage device 14-3.

The nature of the inconsistency can differ depending on the particular type of storage system metadata 40. By way of non-limiting example, storage system metadata inconsistencies include RAID metadata that indicates the RAID system utilizes a greater number of storage devices 14 than are actually attached to the computing device 12. Another example is LVM metadata on one storage device 14 that was attached to a particular computing device, and LVM metadata on another storage device 14 that had previously been attached to a different computing device. Storage system metadata inconsistency may also arise even in situations where the storage devices 14-1-14-3 were not assembled from different computing devices. For example, the computing device 12 may have, at a previous point in time, lost power during a write operation to storage system metadata 40 on one of the storage devices 14-1-14-3. Multiple operating systems executing on the computing device 12 at different periods of time can sometimes result in storage system metadata inconsistencies. Partial disk formatting of a storage device 14 can result in storage system metadata inconsistencies.

During the device discovery function the kernel module 36 may issue messages relating to the device discovery function, and may issue error codes as a result of the storage system metadata inconsistencies. For example, device driver processes initiated by the kernel module 36 may issue informational and/or debugging messages associated with the respective storage devices 14. At some point during the device discovery function of the installation module 38, the device discovery function cannot complete successfully due to a storage system metadata inconsistency. In one example, in response to the storage system metadata inconsistency, the installation module 38 may initiate a storage error tool module 44-1 from the storage error tool module code 34 on the DVD 28. The storage error tool module 44-1 accesses the storage devices 14, and determines, for each storage system metadata segment 42, the location of the respective storage system metadata segment 42 and the length of the storage system metadata segment 42. For each respective storage system metadata segment 42, the storage error tool module 44-1 sends location information that identifies the location of the respective storage system metadata segment 42, length information that identifies the length of the respective storage system metadata segment 42, and the respective storage system metadata segment 42 itself to a remote storage device 46 via a network 48. The remote storage device 46 may comprise any suitable device capable of storing the data sent by the storage error tool module 44-1, such as, by way of non-limiting example, a network-attached storage device, or a computing device with an attached storage device.

Because the storage error tool module 44-1 is a component of the computing device 12, functionality implemented by the storage error tool module 44-1 may be attributed herein to the computing device 12. Moreover, in examples where the storage error tool module 44-1 comprises software instructions that cause the processor device 16 to carry out functionality discussed herein, functionality implemented by storage error tool module 44-1 may be attributed herein to the processor device 16.

The storage error tool module 44-1 may also access the storage system model data that models the storage system metadata 40 generated by the installation module 38, and send the storage system model data to the remote storage device 46. Additionally, the storage error tool module 44-1 may send a label type of each storage device 14-1-14-3 to the remote storage device 46. The storage error tool module 44-1 may also access kernel messages emitted by the kernel module 36 during the device discovery function and send the kernel messages to the remote storage device 46. The storage error tool module 44-1 may also access error messages and/or error codes emitted by the kernel module 36 and/or the installation module 38 during the device discovery function and send the error messages and/or error codes to the remote storage device 46.

While the data sent to the remote storage device 46 by the storage error tool module 44-1 may be organized in any desired manner, in one example, a first data segment 50-1 contains information associated with the storage system metadata segments 42-1A-42-1C of the storage device 14-1. Such information may include a label type 52-1 of the storage device 14-1, and the lengths and locations of each of the storage system metadata segments 42-1A-42-1C. The first data segment 50-1 may be followed by copies 54-1A, 54-1B and 54-1C of the storage system metadata segments 42-1A, 42-1B and 42-1C, respectively.

A second data segment 50-2 contains information associated with the storage system metadata segments 42-2A-42-2C of the storage device 14-2. Such information may include a label type 52-2 of the storage device 14-2, and the lengths and locations of each of the storage system metadata segments 42-2A-42-2C. The second data segment 50-2 may be followed by copies 54-2A, 54-2B and 54-2C of the storage system metadata segments 42-2A, 42-2B and 42-2C, respectively.

A third data segment 50-3 contains information associated with the storage system metadata segment 42-3A of the storage device 14-3. Such information may include a label type 52-3 of the storage device 14-3, and the length and location of each of the storage system metadata segment 42-3A. The third data segment 50-3 may be followed by a copy 54-3A of the storage system metadata segment 42-3A. A fourth data segment 50-4 contains information such as a copy of the storage system model data generated by the installation module 38, relevant kernel messages generated by the kernel module 36 during the device discovery function, and any error message and/or error codes generated during the device discovery function.

While not illustrated, the storage error tool module 44-1 may also collect or otherwise obtain any additional data that may be useful for recreating the storage metadata inconsistency and send such data to the remote storage device 46 for storing. By way of non-limiting example, the storage error tool module 44-1 may obtain a stack trace of any userspace storage tools and/or libraries that may be involved in a failure associated with the storage metadata inconsistency, and send the stack trace to the remote storage device 46.

Figure 2:
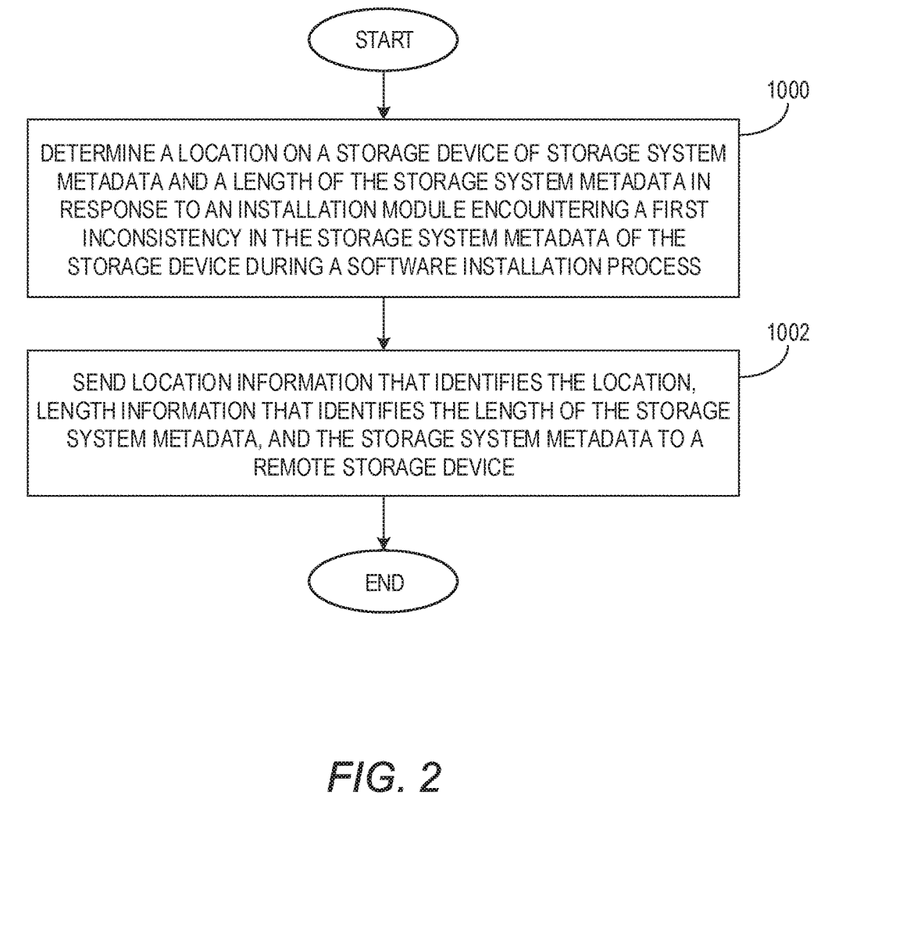
FIG. 2 is a flowchart of a method for storing data associated with an inconsistency in storage system metadata according to one example.

FIG. 2 is a flowchart of a method for storing data associated with an inconsistency in storage system metadata according to one example. FIG. 2 will be discussed in conjunction with FIG. 1. The storage error tool module 44-1 determines locations on the storage devices 14-1-14-3 of the storage system metadata 40 and lengths of the storage system metadata 40 in response to the installation module 38 encountering a first inconsistency in the storage system metadata 40 during the software installation process (block 1000). The storage error tool module 44-1 sends the location information that identifies the locations, length information that identifies the lengths of the storage system metadata 40, and the storage system metadata to the remote storage device 46 (block 1002).

Figure 3A:
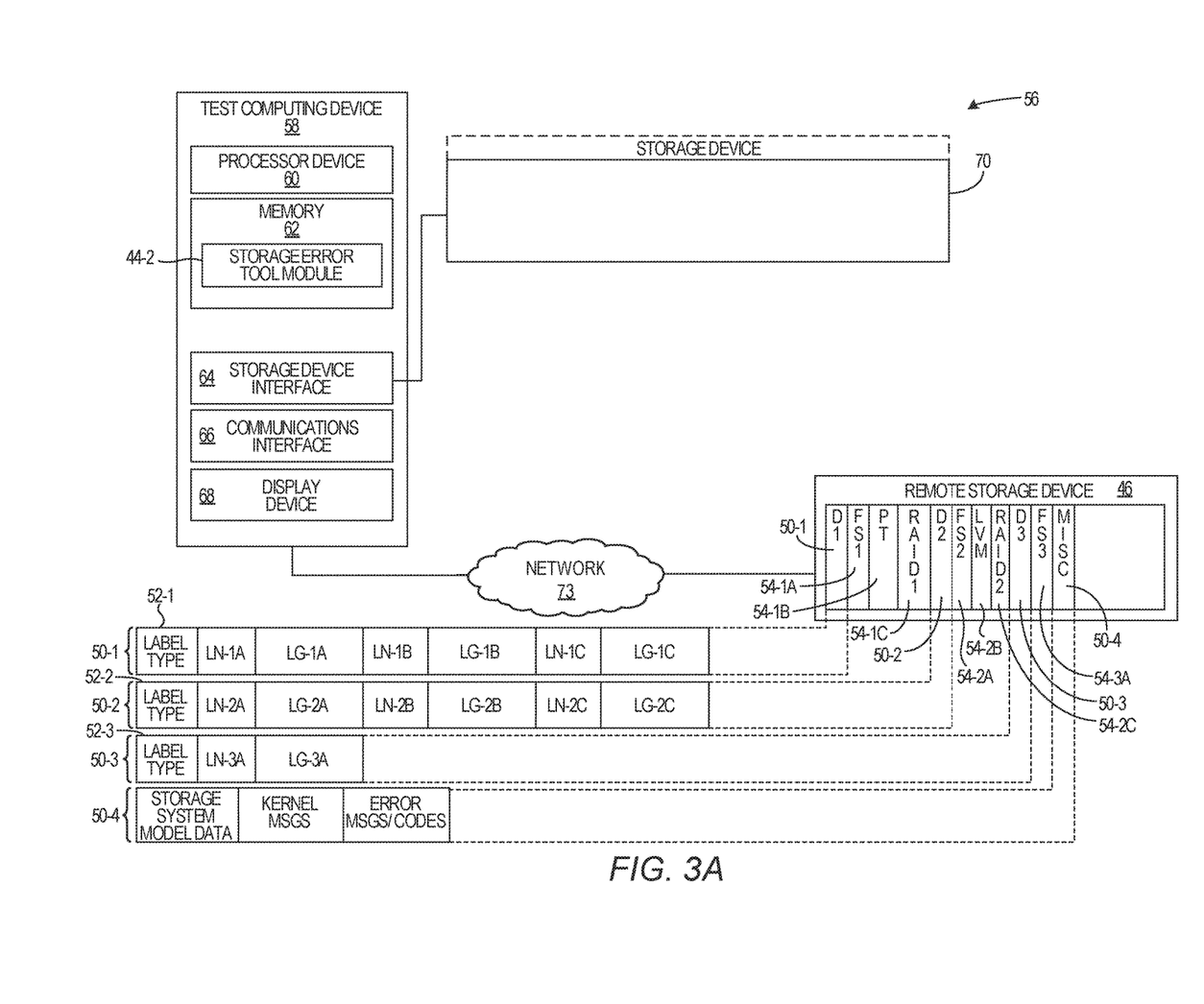
FIGS. 3A-3C are block diagrams of a test environment suitable for reproducing the inconsistency in the storage system metadata discussed with regard to FIGS. 1-2 according to one example.
Figure 3B:
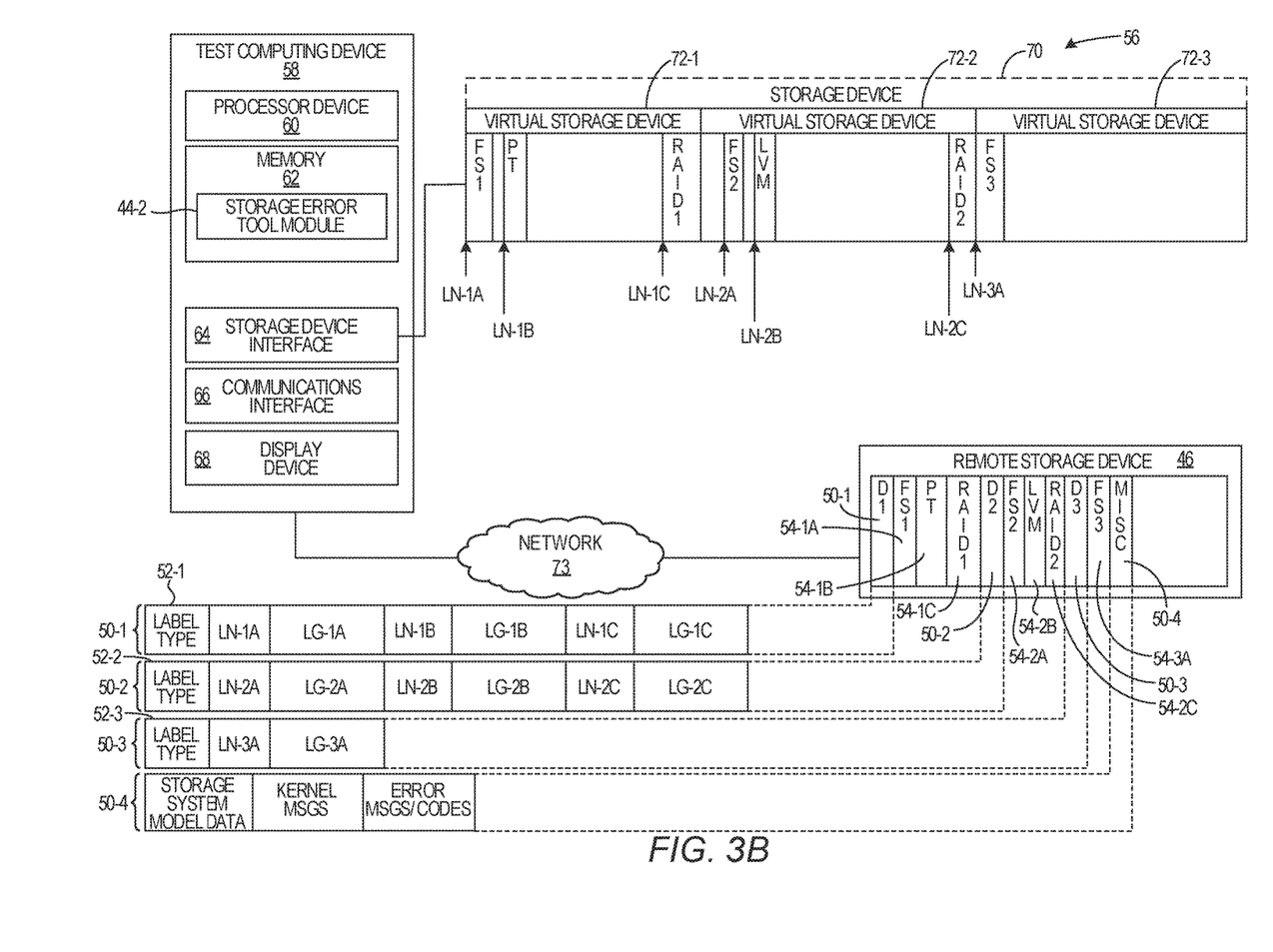
Figure 3C:
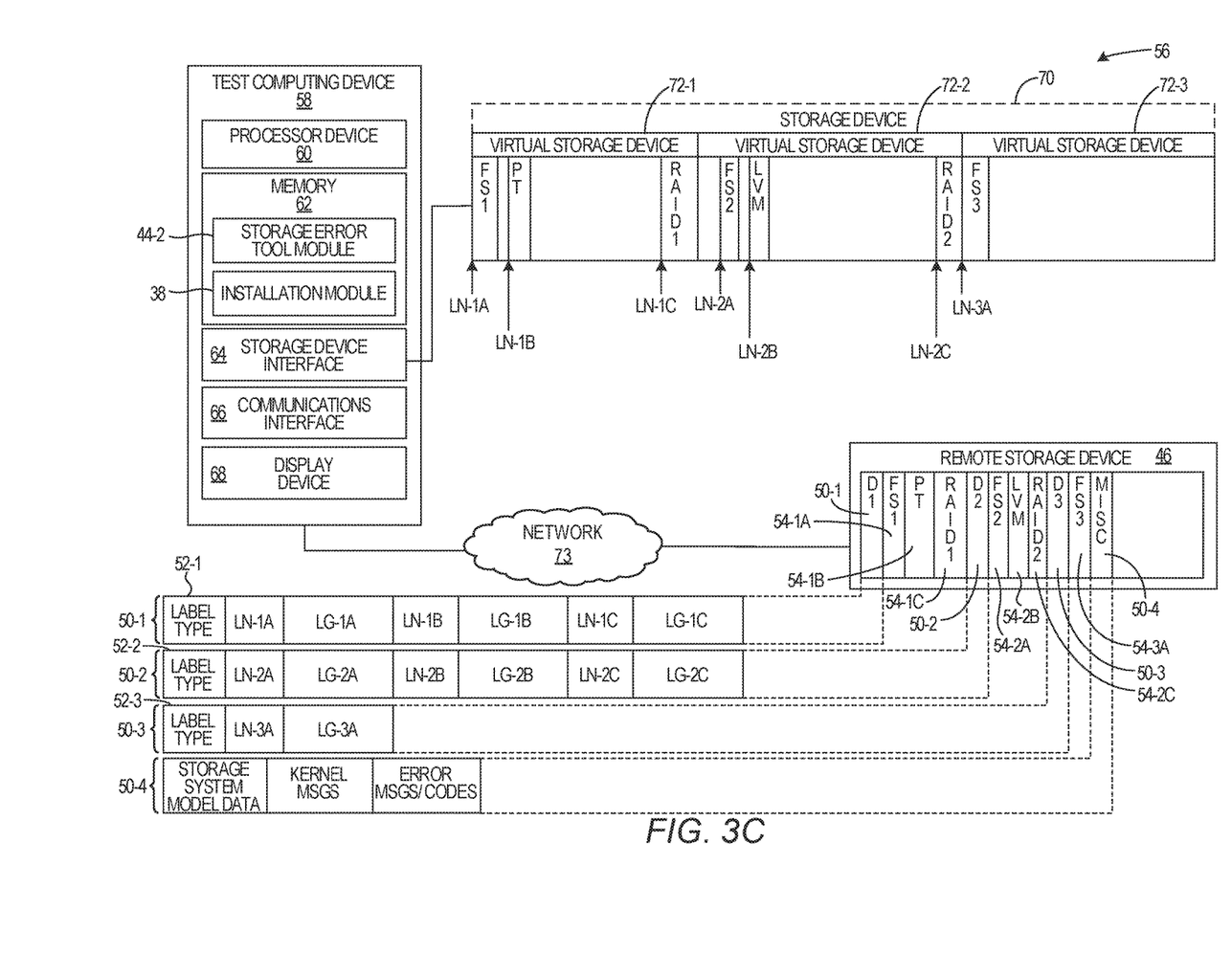

FIGS. 3A-3C are block diagrams of a test environment 56 at successive periods of time that reproduce the storage system metadata inconsistency encountered in the system 10 discussed above with regard to FIGS. 1 and 2. Referring first to FIG. 3A, the test environment 56 includes a test computing device 58 that comprises a processor device 60, a memory 62, a storage device interface 64, a communications interface 66 and a display device 68. The test computing device 58 is attached to a storage device 70. The test computing device 58 can communicate with the remote storage device 46 via a network 73. A storage error tool module 44-2 operates, as described in subsequent detail herein, to recreate the storage system metadata inconsistency discussed above. The storage error tool module 44-2 may be part of a same module as the storage error tool module 44-1, or may be a separate module.

FIG. 3B is a block diagram of the test environment 56 during a period of time after that depicted in FIG. 3A. In this example, the storage device 70 may be associated with a virtual machine, and three virtual storage devices 72-1-72-3 may be configured to model the three storage devices 14-1-14-3 illustrated in FIG. 1. Thus, the virtual storage device 72-1 is formatted to be the same size as the storage device 14-1, the virtual storage device 72-2 is formatted to be the same size as the storage device 14-2, and the virtual storage device 72-3 is formatted to be the same size as the storage device 14-3. The use of virtual storage devices rather than separate physical devices is merely for convenience, and the examples may alternatively be practiced with physical storage devices rather than virtual storage devices.

The storage error tool module 44-2 accesses the remote storage device 46 and based on the location information and length information identified in the data segment 50-1, copies the copies 54-1A, 54-1B, and 54-1C of the storage system metadata segments 42-1A, 42-1B, and 42-1C to the corresponding locations LN-1A, LN-1B, and LN-1C of the virtual storage device 72-1 to precisely recreate the state of the storage system metadata of the storage device 14-1 when the installation module 38 (FIG. 1) encountered the storage system metadata inconsistency. By "corresponding location," it is meant that the location LN-1A on the virtual storage device 72-1 of the copy 54-1A is the same location, such as the same byte or block offset, as the location LN-1A of the storage device 14-1. Similarly, the storage error tool module 44-2 accesses the remote storage device 46 and based on the location information and length information identified in the data segment 50-2, copies the copies 54-2A, 54-2B, and 54-2C of the storage system metadata segments 42-2A, 42-2B, and 42-2C to the corresponding locations LN-2A, LN-2B, and LN-2C of the virtual storage device 72-2. The storage error tool module 44-2 accesses the remote storage device 46 and based on the location information and length information identified in the data segment 50-3, copies the copy 54-3A of the storage system metadata segment 42-3A to the corresponding location LN-3A of the virtual storage device 72-3.

At this point in time the virtual storage devices 72-1-72-3 contain precise copies of the storage system metadata 40 located on the storage devices 14-1-14-3. FIG. 3C is a block diagram of the test environment 56 during a period of time after that depicted in FIG. 3A. The storage error tool module 44-2 initiates the installation module 38. The installation module 38 initiates the device discovery function to identify each virtual storage device 72-1-72-3 attached to the test computing device 58, and determine the existing user storage state of the virtual storage devices 72-1-72-3.

At some point during the device discovery function of the installation module 38, the device discovery function cannot complete successfully due to the storage system metadata inconsistency. The storage error tool module 44-2 determines that the inconsistency encountered by the installation module 38 is the same storage system metadata inconsistency encountered by the installation module 38 during the software installation process discussed above with regard to FIG. 1. The storage error tool module 44-2 outputs a message indicating that the storage system metadata 40 of the computing device 12 has been successfully recreated on the test computing device 58. The message may, by way of non-limiting example, be output to the display device 68, output to a logfile, or output in any other suitable fashion. Engineers may then revise the installation module 38 to alter the behavior of the installation module 38 when the same storage system metadata inconsistency is encountered in the future. The revisions to the installation module 38 can be tested by running the revised installation module 38 against the virtual storage devices 72-1-72-3.

In one example, the storage error tool module 44-2 determines that the inconsistency encountered by the installation module 38 is the same storage system metadata inconsistency encountered by the installation module 38 during the software installation process discussed above with regard to FIG. 1 by accessing test storage system model data generated by the installation module 38 while processing the virtual storage devices 72-1-72-3 and comparing it to the storage system model data stored in the fourth data segment 50-4 on the remote storage device 46 that was generated by the installation module 38 during the software installation process discussed above with regard to FIG. 1. If the test storage system model data matches the storage system model data, the storage error tool module 44-2 may determine that the inconsistency encountered by the installation module 38 is the same storage system metadata inconsistency encountered by the installation module 38 during the software installation process discussed above with regard to FIG. 1. The storage error tool module 44-2 may also, or in the alternative, determine that the inconsistency encountered by the installation module 38 is the same storage system metadata inconsistency encountered by the installation module 38 during the software installation process discussed above with regard to FIG. 1 by comparing the storage system metadata segments on the virtual storage devices 72 with the corresponding storage system metadata segments stored on the remote storage device 46. If the storage system metadata segments on the virtual storage devices 72 match the corresponding storage system metadata segments stored on the remote storage device 46, the storage error tool module 44-2 may determine that the inconsistency encountered by the installation module 38 is the same storage system metadata inconsistency encountered by the installation module 38 during the software installation process discussed above with regard to FIG. 1.

The storage error tool module 44-2 may also, or in the alternative, determine that the inconsistency encountered by the installation module 38 is the same storage system metadata inconsistency encountered by the installation module 38 during the software installation process discussed above with regard to FIG. 1 by comparing the kernel messages and/or error messages/codes generated during the device discovery function on the test computing device 58 with the kernel messages and/or error messages/codes in the data segment 50-4 that were generated during the device discovery function on the computing device 12 discussed above with regard to FIG. 1. If such kernel messages and/or error messages/codes match, the storage error tool module 44-2 may determine that the inconsistency encountered by the installation module 38 is the same storage system metadata inconsistency encountered by the installation module 38 during the software installation process discussed above with regard to FIG. 1.

Figure 4:
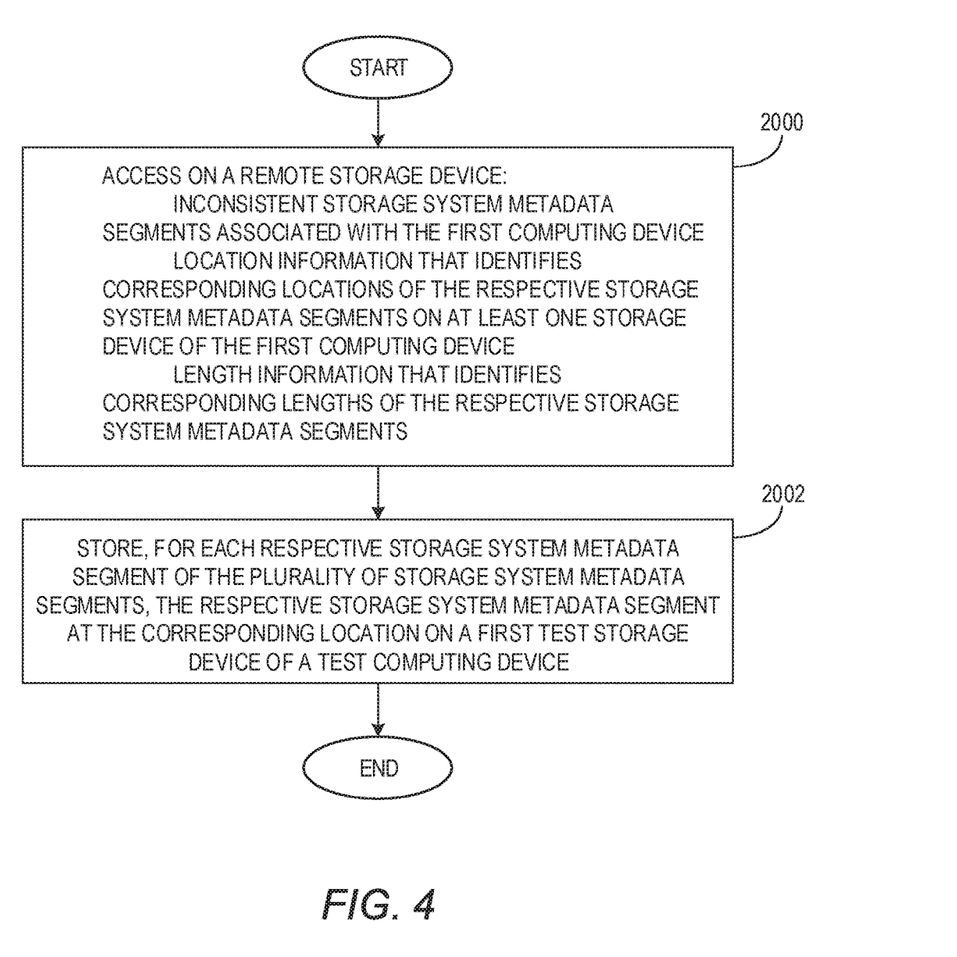
FIG. 4 is a flowchart of a method for recreating a first inconsistency in storage system metadata encountered by an installation module during a software installation process on a first computing device according to one example.

FIG. 4 is a flowchart of a method for recreating a first inconsistency in storage system metadata encountered by an installation module during a software installation process on a first computing device according to one example. FIG. 4 will be discussed in conjunction with FIGS. 3A-3C. The storage error tool module 44-2 accesses, on the remote storage device 46, the copies 54 of the inconsistent storage system metadata segments 42 associated with the computing device 12, the location information that identifies the corresponding locations of the respective storage system metadata segments 42 on the storage devices 14 of the computing device 12, and the length information that identifies corresponding lengths of the respective storage system metadata segments 42 (block 2000). The storage error tool module 44-2 then stores, for each copy 54 of a respective storage system metadata segment 42, the respective copy 54 at the corresponding location on the virtual storage devices 72 of the test computing device 58 (block 2002).

Figure 5:
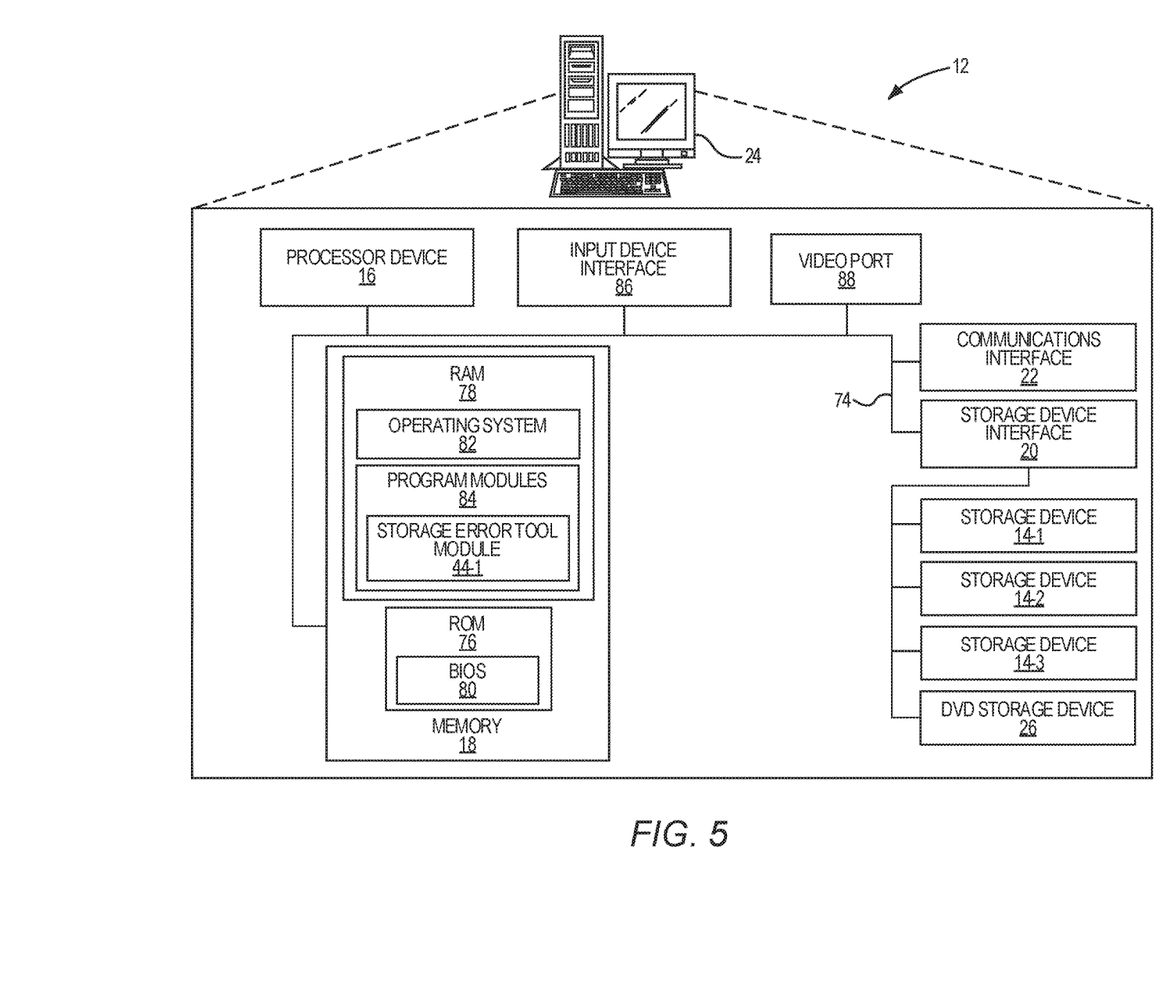
FIG. 5 is a block diagram of the first computing device suitable for implementing examples according to one example.

FIG. 5 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 16, the memory 18, and a system bus 74. The system bus 74 provides an interface for system components including, but not limited to, the memory 18 and the processor device 16. The processor device 16 can be any commercially available or proprietary processor.

The system bus 74 may be any of several types of bus structures that may further interconnect to a memory bus (with or without a memory controller), a peripheral bus, and/or a local bus using any of a variety of commercially available bus architectures. The memory 18 may include non-volatile memory 76 (e.g., read-only memory (ROM), erasable programmable read-only memory (EPROM), electrically erasable programmable read-only memory (EEPROM), etc.), and volatile memory 78 (e.g., random-access memory (RAM)). A basic input/output system (BIOS) 80 may be stored in the non-volatile memory 76 and can include the basic routines that help to transfer information between elements within the computing device 12. The volatile memory 78 may also include a high-speed RAM, such as static RAM, for caching data.

The computing device 12 may further include or be coupled to one or more non-transitory computer-readable storage mediums such as the storage devices 14-1-14-3 and the DVD storage device 26, via the storage device interface 20. The storage devices 14-1-14-3 may comprise, for example, internal or external hard disk drive (HDD) or solid state drives (SSD), or the like. The storage devices 14 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage devices 14 and/or DVD storage device 26, and in the volatile memory 78, including an operating system 82 and one or more program modules 84, such as the storage error tool module 44-1, which may implement the functionality described herein in whole or in part. It is to be appreciated that the examples can be implemented with various commercially available operating systems 82 or combinations of operating systems 82.

All or a portion of the examples may be implemented as a computer program product stored on a transitory or non-transitory computer-usable or computer-readable storage medium, such as the storage devices 14 and/or DVD storage device 26, which includes complex programming instructions, such as complex computer-readable program code, to cause the processor device 16 to carry out the steps described herein. Thus, the computer-readable program code can comprise software instructions for implementing the functionality of the examples described herein when executed on the processor device 16. The processor device 16, in conjunction with the storage error tool module 44-1 in the volatile memory 78, may serve as a controller, or control system, for the computing device 12 that is to implement the functionality described herein.

An operator may also be able to enter one or more configuration commands through a keyboard (not illustrated) or a pointing device such as a mouse (not illustrated). Such input devices may be connected to the processor device 16 through an input device interface 86 that is coupled to the system bus 74 but can be connected by other interfaces such as a parallel port, an Institute of Electrical and Electronic Engineers (IEEE) 1394 serial port, a Universal Serial Bus (USB) port, an IR interface, and the like.

The computing device 12 may also include the communications interface 22 suitable for communicating with the network 48 as appropriate or desired. The computing device 12 may also include a video port 88 configured to interface with the display device 24, to provide information to the user.

Figure 6:
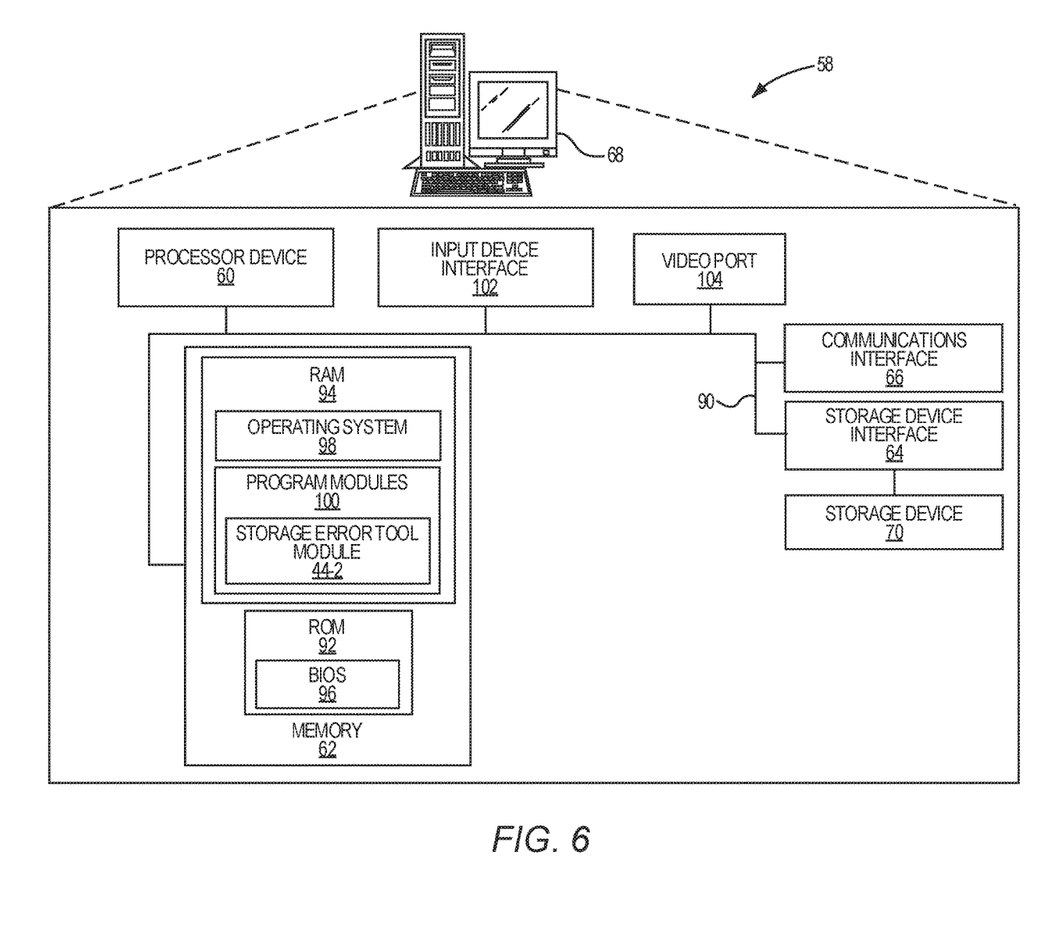
FIG. 6 is a block diagram of a test computing device suitable for implementing examples according to one example.

FIG. 6 is a block diagram of the test computing device 58 suitable for implementing examples according to one example. The test computing device 58 may comprise any computing or electronic device capable of including firmware, hardware, and/or executing software instructions to implement the functionality described herein, such as a computer server, a desktop computing device, a laptop computing device, or the like. The test computing device 58 includes the processor device 60, the memory 62, and a system bus 90. The system bus 90 provides an interface for system components including, but not limited to, the memory 62 and the processor device 60. The processor device 60 can be any commercially available or proprietary processor.

The system bus 90 may be any of several types of bus structures that may further interconnect to a memory bus (with or without a memory controller), a peripheral bus, and/or a local bus using any of a variety of commercially available bus architectures. The memory 62 may include non-volatile memory 92 (e.g., read-only memory (ROM), erasable programmable read-only memory (EPROM), electrically erasable programmable read-only memory (EEPROM), etc.), and volatile memory 94 (e.g., random-access memory (RAM)). A basic input/output system (BIOS) 96 may be stored in the non-volatile memory 92 and can include the basic routines that help to transfer information between elements within the test computing device 58. The volatile memory 94 may also include a high-speed RAM, such as static RAM, for caching data.

The test computing device 58 may further include or be coupled to one or more non-transitory computer-readable storage mediums such as the storage device 70 via the storage device interface 64. The storage device 70 may comprise, for example, an internal or external hard disk drive (HDD) or a solid state drive (SSD), or the like. The storage device 70 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and further, that any such media may contain computer-executable instructions for performing novel methods of the disclosed examples.

A number of modules can be stored in the storage device 70 and in the volatile memory 94, including an operating system 98 and one or more program modules 100, such as the storage error tool module 44-2, which may implement the functionality described herein in whole or in part. It is to be appreciated that the examples can be implemented with various commercially available operating systems 98 or combinations of operating systems 98.

All or a portion of the examples may be implemented as a computer program product stored on a transitory or non-transitory computer-usable or computer-readable storage medium, such as the storage device 70, which includes complex programming instructions, such as complex computer-readable program code, to cause the processor device 60 to carry out the steps described herein. Thus, the computer-readable program code can comprise software instructions for implementing the functionality of the examples described herein when executed on the processor device 60. The processor device 60, in conjunction with the storage error tool module 44-2 in the volatile memory 94, may serve as a controller, or control system, for the test computing device 58 that is to implement the functionality described herein.

An operator may also be able to enter one or more configuration commands through a keyboard (not illustrated) or a pointing device such as a mouse (not illustrated). Such input devices may be connected to the processor device 60 through an input device interface 102 that is coupled to the system bus 90 but can be connected by other interfaces such as a parallel port, an Institute of Electrical and Electronic Engineers (IEEE) 1394 serial port, a Universal Serial Bus (USB) port, an IR interface, and the like.

The test computing device 58 may also include the communications interface 66 suitable for communicating with the network 73 as appropriate or desired. The test computing device 58 may also include a video port 104 configured to interface with the display device 68, to provide information to the user.

Individuals will recognize improvements and modifications to the preferred examples of the disclosure. All such improvements and modifications are considered within the scope of the concepts disclosed herein and the claims that follow.

What is claimed is:

1. A method for recreating a first inconsistency in storage system metadata encountered by an installation module during a software installation process on a first computing device comprising:
   accessing on a remote storage device by a test computing device comprising a processor device:
      inconsistent storage system metadata associated with the first computing device, the inconsistent storage system metadata comprising a plurality of storage system metadata segments that contain information identified as being inconsistent by a process that analyzed the storage system metadata segments;
      location information that identifies corresponding locations of the respective storage system metadata segments on at least one storage device of the first computing device; and
      length information that identifies corresponding lengths of the respective storage system metadata segments; and
   storing, for each respective storage system metadata segment of the plurality of storage system metadata segments, the respective storage system metadata segment at the corresponding location on a first test storage device of the test computing device to recreate the inconsistent storage system metadata on the first test storage device such that the installation module will encounter the first inconsistency when executing on the test computing device, and to facilitate testing of modifications of the installation module to enable the installation module to recognize the inconsistent storage system metadata and take appropriate action.

2. The method of claim 1 wherein:
   the location information that identifies the corresponding locations of the respective storage system metadata segments on the at least one storage device of the first computing device comprises location information that identifies the corresponding locations of the respective storage system metadata segments on the at least one storage device and a second storage device of the first computing device; and
   storing, for each respective storage system metadata segment of the plurality of storage system metadata segments, the respective storage system metadata segment at the corresponding location on the first test storage device of the test computing device comprises storing, for each respective storage system metadata segment of the plurality of storage system metadata segments, the respective storage system metadata segment at the corresponding location on the first test storage device or a second test storage device of the test computing device.

3. The method of claim 2 further comprising:
   initiating the installation module to perform the software installation process on the test computing device;
   determining that the software installation process encountered a second inconsistency in the storage system metadata of the first test storage device and the second test storage device;
   determining that the second inconsistency is a same inconsistency as the first inconsistency; and
   outputting a message indicating that the storage system metadata of the first computing device has been successfully recreated on the test computing device.

4. The method of claim 3 wherein determining that the second inconsistency is the same inconsistency as the first inconsistency comprises:
   accessing, by the test computing device, on the remote storage device, first storage system model data generated by the installation module during the software installation process on the first computing device that models the at least one storage device and the second storage device;
   accessing test storage system model data generated by the installation module during the software installation process on the test computing device that models the first test storage device and the second test storage device; and
   determining that the first storage system model data matches the test storage system model data.

5. The method of claim 3 wherein determining that the second inconsistency is the same inconsistency as the first inconsistency comprises determining that the storage system metadata segments on the first test storage device and the second test storage device match corresponding storage system metadata segments on the remote storage device.

6. The method of claim 1 wherein the storage system metadata comprises at least one of file system metadata, redundant array of independent disks (RAID) metadata, a partition table metadata, and logical volume manager (LVM) metadata.

7. The method of claim 1 wherein a first storage system metadata segment of the plurality of storage system metadata segments comprises file system metadata, a second storage system metadata segment comprises RAID metadata, and a third storage system metadata segment comprises partition table metadata.

8. A method comprising:
   determining, by a first computing device comprising a processor device, a plurality of different locations on at least one storage device of storage system metadata comprising a plurality of storage system metadata segments, and a plurality of corresponding lengths of the plurality of storage system metadata segments in response to an installation module encountering a first inconsistency in the storage system metadata of the at least one storage device of the first computing device during a software installation process; and
   sending, by the first computing device, for each respective storage system metadata segment of the plurality of storage system metadata segments, location information that identifies the corresponding location of the respective storage system metadata segment, length information that identifies the length of the respective storage system metadata segment, and the respective storage system metadata segment to a remote storage device, for subsequent use in recreating the inconsistent storage system metadata on a first test storage device such that the installation module will encounter the first inconsistency when executing on a test computing device, and to facilitate testing of modifications of the installation module to enable the installation module to recognize the inconsistent storage system metadata and take appropriate action.

9. The method of claim 8 wherein the storage system metadata comprises at least one of file system metadata, redundant array of independent disks (RAID) metadata, a partition table metadata, and logical volume manager (LVM) metadata.

10. The method of claim 8 wherein:
   the plurality of storage system metadata segments are located at a plurality of different corresponding locations on the at least one storage device and a second storage device;

determining the plurality of different locations on the at least one storage device of the storage system metadata and the plurality of corresponding lengths of the plurality of storage system metadata segments comprises determining, for each respective storage system metadata segment of the plurality of storage system metadata segments, a corresponding location on the at least one storage device or the second storage device, and a corresponding length of the respective storage system metadata segment; and sending the location information that identifies the corresponding location of the respective storage system metadata segment, length information that identifies the length of the respective storage system metadata segment, and the respective storage system metadata segment to the remote storage device comprises sending, for each respective storage system metadata segment of the plurality of storage system metadata segments, the location information that identifies the corresponding location of the respective storage system metadata segment on the at least one storage device or the second storage device, the length information that identifies the corresponding length of the respective storage system metadata segment, and the respective storage system metadata segment to the remote storage device.

11. The method of claim 10 wherein a first storage system metadata segment comprises file system metadata, a second storage system metadata segment comprises redundant array of independent disks metadata, and a third storage system metadata segment comprises partition table metadata.

12. The method of claim 11 further comprising accessing storage system model data generated by the installation module that models the at least one storage device and the second storage device, and sending the storage system model data to the remote storage device.

13. The method of claim 12 further comprising accessing storage system error data generated during processing of the installation module, and sending the storage system error data to the remote storage device.

14. The method of claim 10 further comprising:
reading, by a test computing device comprising a second processor device, from the remote storage device, for each respective storage system metadata segment of the plurality of storage system metadata segments, the location information that identifies the location of the respective storage system metadata segment, the length information that identifies the length of the respective storage system metadata segment, and the respective storage system metadata segment from the remote storage; and
storing, for each respective storage system metadata segment of the plurality of storage system metadata segments, the respective storage system metadata segment at the corresponding location on a first test storage device and a second test storage device of the test computing device.

15. The method of claim 14 further comprising:
initiating the installation module to initiate the software installation process on the test computing device;
determining that the software installation process encountered a second inconsistency in the storage system metadata of the first test storage device and the second test storage device;
determining that the second inconsistency is a same inconsistency as the first inconsistency; and
outputting a message indicating that the storage system metadata of the first computing device has been successfully recreated on the test computing device.

16. The method of claim 15 further comprising:
accessing, by the first computing device, first storage system model data generated by the installation module that models the at least one first storage device and the second storage device;
sending the storage system model data to the remote storage device; and
wherein determining that the second inconsistency is the same inconsistency as the first inconsistency comprises:
accessing, by the test computing device, test storage system model data generated by the installation module that models the first test storage device and the second test storage device; and
determining that the first storage system model data matches the test storage system model data.

17. The method of claim 15 wherein determining that the second inconsistency is a same inconsistency as the first inconsistency comprises determining that the storage system metadata segments on the first test storage device and the second test storage device match the corresponding storage system metadata segments on the remote storage device.

18. A test computing device for recreating a first inconsistency in storage system metadata encountered by an installation module during a software installation process on a first computing device, comprising:
a memory; and
a processor device coupled to the memory to:
access on a remote storage device:
inconsistent storage system metadata associated with the first computing device, the inconsistent storage system metadata comprising a plurality of storage system metadata segments that contain information identified as being inconsistent by a process that analyzed the storage system metadata segments;
location information that identifies corresponding locations of the respective storage system metadata segments on at least one storage device of the first computing device; and
length information that identifies corresponding lengths of the respective storage system metadata segments; and
store, for each respective storage system metadata segment of the plurality of storage system metadata segments, the respective storage system metadata segment at the corresponding location on a first test storage device of the test computing device to recreate the inconsistent storage system metadata on the first test storage device such that the installation module will encounter the first inconsistency when executing on the test computing device, and to facilitate testing of modifications of the installation module to enable the installation module to recognize the inconsistent storage system metadata and take appropriate action.

19. A computer program product for recreating a first inconsistency in storage system metadata encountered by an installation module during a software installation process on a first computing device, the computer program product stored on a non-transitory computer-readable storage medium and including instructions to cause a processor device to:
access on a remote storage device:
inconsistent storage system metadata associated with the first computing device, the inconsistent storage system metadata comprising a plurality of storage system metadata segments that contain information identified as being inconsistent by a process that analyzed the storage system metadata segments;

location information that identifies corresponding locations of the respective storage system metadata segments on at least one storage device of the first computing device; and length information that identifies corresponding lengths of the respective storage system metadata segments; and store, for each respective storage system metadata segment of the plurality of storage system metadata segments, the respective storage system metadata segment at the corresponding location on a first test storage device of a test computing device to recreate the inconsistent storage system metadata on the first test storage device such that the installation module will encounter the first inconsistency when executing on the test computing device, and to facilitate testing of modifications of the installation module to enable the installation module to recognize the inconsistent storage system metadata and take appropriate action.

\* \* \* \* \*